June 9, 1964  W. E. O'SHEI  3,135,983
WINDSCREEN WIPERS
Filed Dec. 15, 1961
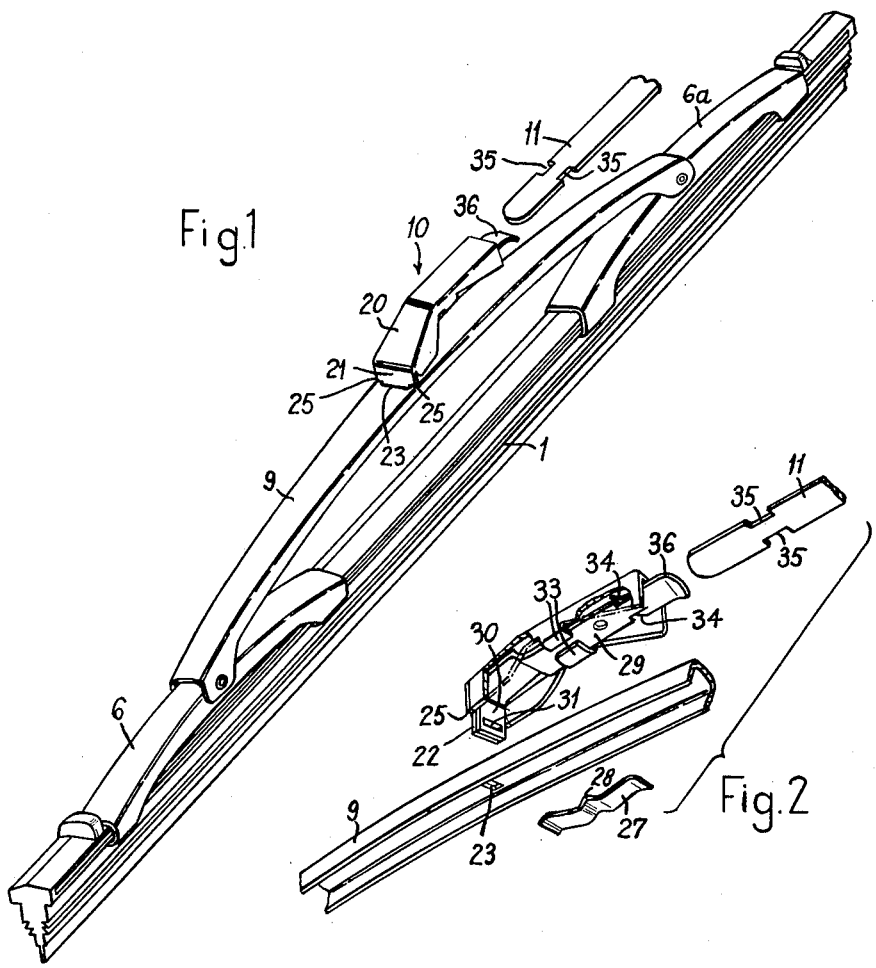
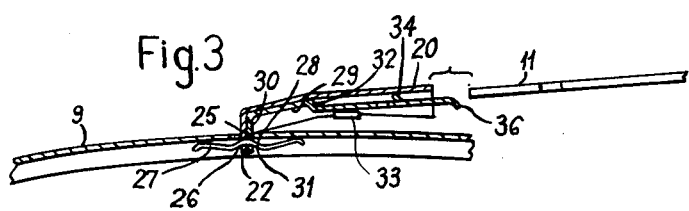
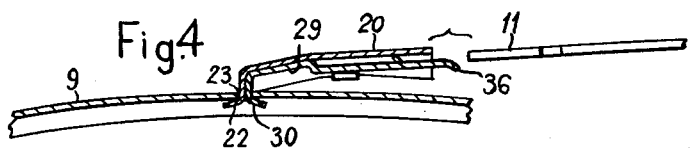
Inventor
W. E. O'Shei
By
Holcomb, Wetherill & Brisebois
Attorneys United States Patent Office 3,135,983
Patented June 9, 1964

3,135,983
WINDSCREEN WIPERS
William Edward O'Shei, 11a Bath Road, Harlington,
Middlesex, England
Filed Dec. 15, 1961, Ser. No. 159,517
Claims priority, application Great Britain Dec. 22, 1960
9 Claims. (Cl. 15—250.32)

The present invention relates to windscreen wipers, and more particularly to an arrangement for connecting a windscreen wiper blade to a wiper arm.

The invention consists in a windscreen wiper blade including a connector for attaching a backing member of the wiper blade to a windscreen wiper arm having its end constituted by a substantially flat strip portion provided with one or more shoulders, said connector comprising a body part having a passage which extends generally in the longitudinal direction of the blade and is adapted to receive the flat end of the wiper arm, and a leaf spring mounted with its free end directed towards the open end of the passage and adapted to flex to admit the end of the arm and then hold the arm in the connector, wherein the ends of the body part and said leaf spring remote from the open end of said passage extend downwardly as tongues which lie side by side and pass together through a transverse slot in the backing member of the wiper blade, at least one of said tongues being retained in said slot to hold the connector assembled to the backing member.

According to a feature of the invention, at least one of said tongues is formed with projecting shoulders which rest on the ends of said transverse slot to form a rocking bearing extending transversely to the longitudinal direction of the blade about which the connector can rock relative to the backing member.

In one embodiment the connector is held assembled to the backing member by forming the portions of the tongues which project through the slot with aligned openings in which engages a retainer, preferably a leaf spring or other resilient means which resiliently urges the projecting shoulders into contact with the ends of the transverse slot.

In another embodiment, the connector and backing member are held assembled together by bending apart the portions of the tongues which project through the slot.

In order that the invention may be more clearly understood, reference will now be made to the accompanying drawing in which:

FIGURE 1 is a perspective view from above of a windscreen wiper blade provided with a connector according to the invention, and showing the end of the wiper arm, FIGURE 2 is an exploded perspective view from below of part of the bridge piece and the connectors shown in FIG. 1, the connector being partly cut away, FIGURE 3 is a longitudinal section through the bridge piece and connector when assembled together, FIGURE 4 is a longitudinal section of a modification.

Referring to the drawings, the windscreen wiper blade shown comprises a squeegee element 1 provided with means for permitting it to flex to conform with the curvature of the windscreen whilst restraining transverse flexing, the squeegee element being mounted in yoke members 6, 6a, intermediate points on which are hingedly connected to a bridge piece 9 of channel shaped cross-section. The windscreen wiper illustrated is more fully described in the specification of my application Serial No. 735,172, filed May 14, 1958 now Patent No. 3,021,549.

The bridge-piece 9 is provided with a connector 10 for attaching the wiper to the end of a wiper arm 11. The connector comprises a channel-shaped body part 20, conveniently formed of sheet metal, having a down-turned end 21, the free end of which is reduced in width to form a tongue portion 22 adapted to pass through a transverse slot 23 formed in the back of the bridge-piece 9 with the shoulders 25 at the base of the tongue resting on the top edges of the side walls of the bridge-piece at opposite ends of the slot 23 to form a kind of knife-edge bearing extending transversely of the wiper. In the portion of the tongue 22 which projects through the slot 23 is formed an opening 26 through which is inserted a retainer comprising a leaf spring 27 of which opposite ends of the spring bear on the underside of the back wall of the bridge-piece so as to press the shoulders 25 into contact with the side walls at the ends of the slot 23. The leaf spring 27 is retained within the opening 26 by forming it with a transverse recess 28 in its central region which interlocks with the bottom edge of the opening 26.

Fitted within the channel of the body part 20 is a leaf spring 29 which is shaped as shown in FIGURE 3 with a down-turned end 30 which lies against the down-turned end 21 of the body 20 and extends as a tongue, together with the tongue portion 22, through the transverse slot 23, the portion of the down-turned end 30 which projects through the slot having an opening 31 aligned with the opening 26 in the tongue 22 so that the retainer leaf spring 27 can pass through both openings 26 and 31 and thereby hold both the body part 20 and the leaf spring 29 assembled together and to the bridge-piece 9. The leaf spring 29 bears against the base of the channel of the body part 20 at its inner end and is then stepped away from the base of the channel as indicated at 32 so that between the free end of the leaf spring and the channel is formed a passage to receive the end of the wiper arm 11. Fingers 33 folded over from the channel edges of the body part 20 urge the free end of the leaf spring towards the base of the channel. Two fingers 34 are struck up from the edges of the leaf spring 29 to form shoulders adapted to engage with the shoulders formed by the notches 35 adjacent the end of the wiper arm 11 when the latter is inserted into the connector, and thus prevent the wiper arm from being withdrawn from the connector. The free end of the leaf spring at the open end of the passage is provided with a finger actuating portion 36, slightly down-turned, so that the spring 29 may be flexed downwardly to disengage the fingers 34 from the shoulders at the ends of the notches 35 when it is desired to detach the connector and wiper blade from the wiper arm.

The free end of the leaf spring 29 flexes away from the base of the channel of the body part 20 during insertion of the wiper arm 11 therein, and the passage formed by the channel of the connector body and the leaf spring snugly or resiliently embraces the end of the wiper arm to restrain any appreciable rocking of the connector body about the longitudinal axis of the end portion of the wiper arm.

The connector described is of simple construction, comprising only two parts, viz. the connector body and the leaf spring, which are held assembled together and to the bridge-piece by a single retainer spring, the whole arrangement restraining appreciable rocking of the wiper around the longitudinal axis of the wiper arm while permitting the wiper blade to hinge relative to the connector about an axis transverse to the longitudinal axis of the wiper blade.

The connector may be held assembled to the bridge-piece in other ways than that described with reference to FIGURES 1–3. In the modification shown in FIGURE 4, the tongues 22 and 30 are retained in the slot 23 by bending the end of one or both of the tongues outwardly.

It will be understood that various modifications may be made without departing from the scope of the invention. For example, an opening for receiving the retaining spring 27 need only be formed in one of the two tongues 22 and 30, in which case one tongue may be cut off at the level of or above the top of the opening in the other tongue, but preferably such that the end of the short tongue will project into the slot 23 so as to avoid relative longitudinal movement between the leaf spring 29 and the body part 20.

I claim:

1. A windscreen wiper blade including a connector for attaching a backing member of the wiper blade to a windscreen wiper arm having its end constituted by a substantially flat strip portion provided with at least one shoulder, said connector comprising a body part having a passage that is open at one end and which extends generally in the longitudinal direction of the blade and is adapted to receive the flat end of the wiper arm, and a leaf spring mounted with its free end directed towards the open end of the passage and adapted to flex to admit the end of the arm and then hold the arm in the connector, wherein the ends of the body part and said leaf spring remote from the open end of said passage extend downwardly as tongues which lie side by side and pass together through a transverse slot in the backing member of the wiper blade, at least one of said tongues being retained in said slot to hold the connector assembled to the backing member.

2. A windscreen wiper as claimed in claim 1, wherein at least one of said tongues is formed with projecting shoulders which rest on the ends of said transverse slot to form a rocking bearing extending transversely to the longitudinal direction of the blade about which the connector can rock relative to the backing member.

3. A windscreen wiper as claimed in claim 2, wherein the portions of the tongues which project through the slot are formed with aligned openings through which a retainer extends.

4. A windscreen wiper as claimed in claim 3, wherein said retainer comprises a leaf spring which also presses against the backing member to urge the projecting shoulders into contact with the ends of the transverse slot.

5. A windscreen wiper as claimed in claim 1, wherein the portions of the tongues which project through the slot are bent apart to hold the connector assembled to the backing member.

6. A windscreen wiper blade including a connector for attaching a backing member of the wiper blade to a windscreen wiper arm having its end constituted by a substantially flat strip portion provided with at least one shoulder, said connector comprising a channel-shaped body part having its channel open at one end and having its other end closed by a wall the free end of which is reduced in width to form a first projecting tongue with shoulders at the base of said first tongue, a leaf spring mounted in said channel with its free end directed towards said open end and forming with the channel a passage adapted to receive the flat end of the wiper arm, said free end of the leaf spring flexing to admit the end of the arm and the other end of said leaf spring being bent to form a second projecting tongue which lies against said first tongue at said closed end of the body part, and said backing member having a transverse slot through which said tongues pass together with said shoulders at the base of the first tongue resting on the ends of the transverse slot to form a rocking bearing about which the connector can rock relative to the backing member, the portion of at least one of said tongues which projects through the slot being provided with an opening, and a retainer comprising a leaf spring extending through said opening with its ends resiliently pressing against the backing member and urging the shoulders at the base of said first tongue into contact with the ends of the transverse slot.

7. A windscreen wiper blade including a connector for attaching a backing member of the wiper blade to a windscreen wiper arm having its end constituted by a substantially flat strip portion provided with at least one shoulder, said connector comprising a channel-shaped body part having its channel open at one end and having its other end closed by a wall the free end of which is reduced in width to form a first projecting tongue with shoulders at the base of said first tongue, a leaf spring mounted in said channel with its free end directed towards said open end and forming with the channel a passage adapted to receive the flat end of the wiper arm, said free end of the leaf spring flexing to admit the end of the arm and the other end of said leaf spring being bent to form a second projecting tongue which lies against said first tongue at said closed end of the body part, and said backing member having a transverse slot through which said tongues pass together with said shoulders at the base of the first tongue resting on the ends of the transverse slot to form a rocking bearing about which the connector can rock relative to the backing member, the portions of said tongues which project through the slot being provided with aligned openings, and a retainer comprising a leaf spring extending through said openings with its ends resiliently pressing against the backing member and urging the shoulders at the base of said first tongue into contact with the ends of the transverse slot.

8. A windscreen wiper blade including a connector for attaching a backing member of the wiper blade to a windscreen wiper arm having its end constituted by a substantially flat strip portion provided with at least one shoulder, said connector comprising a channel-shaped body part having its channel open at one end and having its other end closed by a wall the free end of which is reduced in width to form a first projecting tongue with shoulders at the base of said first tongue, a leaf spring mounted in said channel with its free end directed towards said open end and forming with the channel a passage adapted to receive the flat end of the wiper arm, said free end of the leaf spring flexing to admit the end of the arm and the other end of said leaf spring being bent to form a second projecting tongue which lies against said first tongue at said closed end of the body part, and said backing member having a transverse slot through which said tongues pass together with said shoulders at the base of the first tongue resting on the ends of the transverse slot to form a rocking bearing about which the connector can rock relative to the backing member, the portions of said tongues which project through the slot being bent apart to hold the connector assembled to the backing member.

9. A windscreen wiper blade including a connector for attaching a backing member of the wiper blade to a windscreen wiper arm having its end constituted by a substantially flat strip portion provided with at least one shoulder, said connector comprising a body part having a passage which extends generally in the longitudinal direction of the blade and is open at one end, a leaf spring forming a wall of said passage with its free end directed towards said open end and arranged to flex to admit the end of the arm, and the other ends of said body part and leaf spring having tongues which lie side by side which project below the body part, said tongues passing together through a transverse slot in the backing member of the wiper blade, and means retaining said tongues in said slot whereby to hold the connector assembled to the backing member.

References Cited in the file of this patent

FOREIGN PATENTS

| 841,248 | Great Britain | July 13, 1960 |
| 1,169,384 | France | Sept. 8, 1958 |
| 1,237,692 | France | June 20, 1960 |